US012755109B2

(12) United States Patent
Sukhija et al.

(10) Patent No.: US 12,755,109 B2
(45) Date of Patent: Oct. 6, 2026

(54) METHOD AND SYSTEM FOR GENERATIVE AI BASED UNIFIED VIRTUAL ASSISTANT

(71) Applicant: Tata Consultancy Services Limited, Mumbai (IN)

(72) Inventors: Chanchal Sukhija, Gurugram (IN); Mahendrababu Ramanathan, Chennai (IN); Ramchandar Raghunathan, Chennai (IN); Amit Kumar Sharma, Indore (IN); Abhishek Bathija, New Delhi (IN); Amey Gujre, Pune (IN); Talish Hussain, West Bengal (IN); Aseem Prakash, Uttar Pradesh (IN); Rahul Vasa, Kolkata (IN); Prashant Bhardwaj, New Delhi (IN); Arunkumar Agrawal, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 130 days.

(21) Appl. No.: 18/772,389

(22) Filed: Jul. 15, 2024

(65) Prior Publication Data

US 2025/0036887 A1 Jan. 30, 2025

(30) Foreign Application Priority Data

Jul. 24, 2023 (IN) ............................ 202321049901

(51) Int. Cl.

| | |
|---|---|
| ***G06F 40/40*** | (2020.01) |
| ***G06F 9/451*** | (2018.01) |
| ***G06F 40/205*** | (2020.01) |

(52) U.S. Cl.

CPC .............. *G06F 40/40* (2020.01); *G06F 9/453* (2018.02); *G06F 40/205* (2020.01)

(58) Field of Classification Search

CPC ......... G06F 40/40; G06F 9/453; G06F 40/205

See application file for complete search history.

(56) References Cited

U.S. PATENT DOCUMENTS

2023/0215282 A1 7/2023 Sastry
2024/0296279 A1 * 9/2024 Gardner ................ G06F 16/338

(Continued)

OTHER PUBLICATIONS

Yao et al., "ReAct: Synergizing Reasoning and Acting in Language Models", Mar. 10, 2023, arXiv: 2210.03629v3, 33 pages (Year: 2023).*

*Primary Examiner* — Pierre Louis Desir
*Assistant Examiner* — Cody Douglas Hutcheson
(74) *Attorney, Agent, or Firm* — Finnegan, Henderson, Farabow, Garrett & Dunner, LLP

(57) ABSTRACT

This disclosure relates generally to a method and system for generative AI based unified virtual assistant. Conventional virtual assistant for enterprise systems needs to be configured for a specific industry or stakeholder and does not provide support for all stakeholders in the enterprise. Also, conventional rule-based virtual assistant or machine learning based virtual assistant need a large database for proper functioning. The disclosed method and system provide a unified virtual assistant for all processes in the enterprise. The unified virtual assistant provides support for all stakeholders in the enterprise and can answer all kinds of queries related to any process of the enterprise according to a role of a user logged into the system. The unified virtual assistant interprets user's query and generates effective prompts depending on the user's query which can be specific to customer, employee, executive or support desk users of the enterprise.

16 Claims, 2 Drawing Sheets

(56) References Cited

U.S. PATENT DOCUMENTS

| | | | | |
|---|---|---|---|---|
| 2024/0311575 | A1* | 9/2024 | Baeuml | G06F 40/35 |
| 2024/0320424 | A1* | 9/2024 | Gore | G06F 40/20 |
| 2024/0346255 | A1* | 10/2024 | Blohm | G06F 40/30 |
| 2024/0378391 | A1* | 11/2024 | Bradley | G06F 40/35 |
| 2024/0403560 | A1* | 12/2024 | Radu | G06F 40/284 |
| 2024/0419918 | A1* | 12/2024 | Vangala | G06F 16/3329 |
| 2024/0419950 | A1* | 12/2024 | Tong | G06N 3/0475 |
| 2024/0420012 | A1* | 12/2024 | Austin | G06N 3/047 |
| 2025/0013788 | A1* | 1/2025 | Chen | G06F 40/30 |
| 2025/0014605 | A1* | 1/2025 | Chen | G06F 16/3329 |
| 2025/0028759 | A1* | 1/2025 | Castillo | G06F 16/838 |
| 2025/0390526 | A1* | 12/2025 | Kundel | G06F 16/3344 |

* cited by examiner

METHOD AND SYSTEM FOR GENERATIVE AI BASED UNIFIED VIRTUAL ASSISTANT

PRIORITY CLAIM

This U.S. patent application claims priority under 35 U.S.C. § 119 to: Indian Patent Application No. 202321049901, filed on Jul. 24, 2023. The entire contents of the aforementioned application are incorporated herein by reference.

TECHNICAL FIELD

The disclosure herein generally relates to virtual assistant, and, more particularly, to a method and system for generative artificial intelligence based unified virtual assistant.

BACKGROUND

Virtual assistants (VAs) are trained for solving a particular problem for a specific purpose like addressing IT service desk or a business process like employee self-service (ESS), human resource (HR) and so on in an enterprise application. A virtual assistant developed for a particular problem, may have to be implemented for additional processes or functions. This may take a lot of additional time, money, and effort and still it may not yield to required results.

Existing virtual assistants do not provide valuable insights and do not perform low-complexity tasks for the users. These VAs do not provide a personalized, human like experience in solving the tasks for the users. They need to be configured for a particular industry and inputs need to be captured while performing any action or transaction. These VAs does not provide support for all stakeholders in the enterprise like supplier, IT service desk, associates, sales, merchandising and supply chain and so on.

Conventional virtual assistants are rule-based and have basic functionalities of answering customer queries which are redundant. These VAs concentrate on single domain knowledge and are not able to answer queries from other domains. These VAs are mostly workflow-driven using business process documents as major input source for the user queries. Contextual virtual assistants use artificial intelligence and machine learning. In these VAs users can ask a wide range of queries, however, the contextual VAs may need access to an extensive database for providing accurate answers to the user queries.

SUMMARY

Embodiments of the present disclosure present technological improvements as solutions to one or more of the above-mentioned technical problems recognized by the inventors in conventional systems. For example, in one embodiment, a method for generative artificial intelligence based unified virtual assistant is provided. The method includes receiving in real time a multi-modal query from a user associated with a role in a user conversation using an enterprise application associated with an enterprise by a virtual assistant engine of a unified virtual assistant. Further, the method includes, creating a user context for the user conversation based on the role associated with the user by the unified virtual assistant. Furthermore, the method includes, generating an optimized prompt for the multi-modal query corresponding to the user context, based on a set of prompt concepts by the unified virtual assistant. Further, the method includes, generating a response corresponding to the optimized prompt from a large language model (LLM) using a customized tool array by the unified virtual assistant. Then the response is formatted to obtain a final output using an output parser by the unified virtual assistant. Finally, the method includes, providing the final output to the user by a virtual assistant head comprised in the unified virtual assistant by the unified virtual assistant.

In another aspect, a system for generative artificial intelligence based unified virtual assistant is provided. The system comprises memory storing instructions; one or more communication interfaces; and one or more hardware processors coupled to the memory via the one or more communication interfaces, wherein the one or more hardware processors are configured by the instructions to receive in real time a multi-modal query from a user associated with a role in a user conversation using an enterprise application associated with an enterprise by a virtual assistant engine of a unified virtual assistant. Further, the system includes, creating a user context for the user conversation based on the role associated with the user by the unified virtual assistant. Furthermore, the system includes, generating an optimized prompt for the multi-modal query corresponding to the user context, based on a set of prompt concepts by the unified virtual assistant. Further, the system includes, generating a response corresponding to the optimized prompt from a large language model (LLM) using a customized tool array by the unified virtual assistant. Then the response is formatted to obtain a final output using an output parser by the unified virtual assistant. Finally, the system includes, providing the final output to the user by a virtual assistant head comprised in the unified virtual assistant by the unified virtual assistant.

The multi-modal query is one of (i) a text, (ii) an image or (iii) a voice data. the set of prompt concepts are dynamically modified for generating the optimized prompt based on the role of the user. The response is generated by initially comparing the optimized prompt with the tool description of each tool in the set of tools to obtain an optimal tool. Further the response is generated by invoking the LLM or an application programming interface (API) call provided in the tool description of the optimal tool. The LLM is trained using an enterprise context corresponding to the enterprise and a set of user contexts stored in a database. The system also comprises, switching between one or more user contexts in a current user conversation based on roles associated with the one or more user contexts.

In yet another aspect, there is provided a computer program product comprising a non-transitory computer readable medium having a computer readable program embodied therein, wherein the computer readable program, when executed on a computing device causes the computing device for generative artificial intelligence based unified virtual assistant by receiving in real time a multi-modal query from a user associated with a role in a user conversation using an enterprise application associated with an enterprise by a virtual assistant engine of a unified virtual assistant. Further the computer readable program includes, creating a user context for the user conversation based on the role associated with the user by the unified virtual assistant. Furthermore, the computer readable program includes, generating an optimized prompt for the multi-modal query corresponding to the user context, based on a set of prompt concepts by the unified virtual assistant. Further the computer readable program includes, generating a response corresponding to the optimized prompt from a large language model (LLM) using a customized tool array by the unified virtual assistant. Then the response is formatted to obtain a final output using an output parser by the unified virtual assistant. Finally, the computer readable program includes, providing the final output to the user by a virtual assistant head comprised in the unified virtual assistant by the unified virtual assistant.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
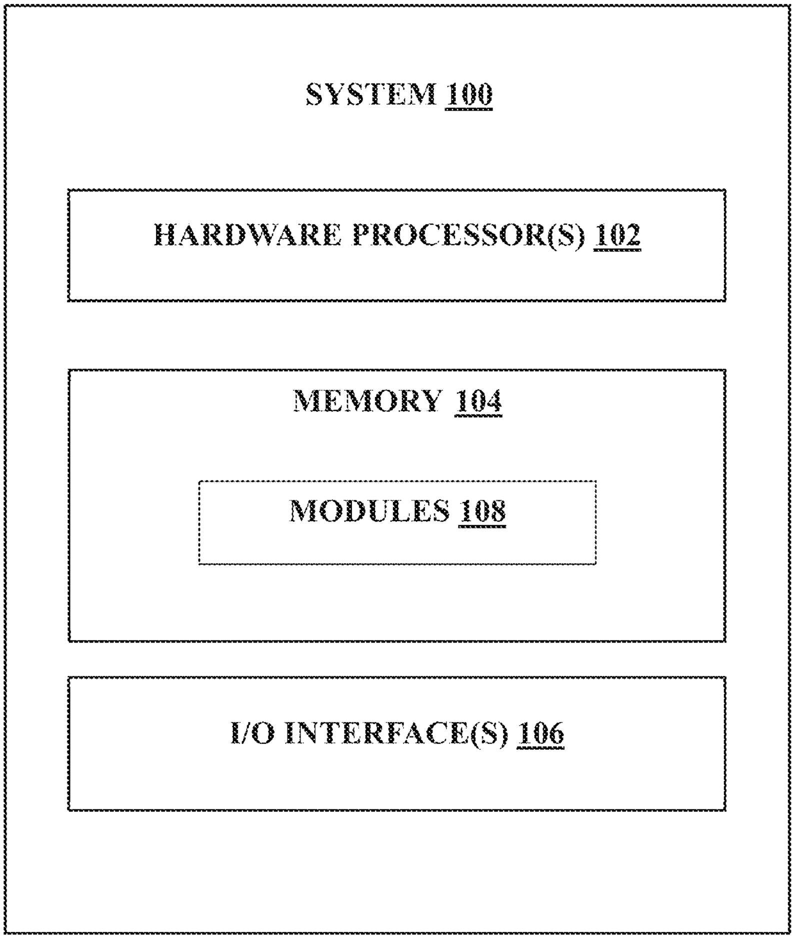
FIG. 1 illustrates an exemplary block diagram of a system for generative artificial intelligence (AI) based unified virtual assistant according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Existing virtual assistants (VAs) do not provide any personalized experience across various stakeholders in an enterprise. They also do not perform any low-complexity tasks for users. Also, they require multiple bots for various processes such as IT helpdesk, customer service desk, business process and so on. The disclosed unified virtual assistant or unified bot provides intelligent, highly responsive, intuitive, personalized, and elevated human-like experience across various stakeholders in the enterprise. In the context of the present disclosure, the expressions “unified virtual assistant”, “unified bot”, and “virtual assistant” may be interchangeably used.

The virtual assistant helps user(s) accomplish various tasks using a single conversational system as their entry point. For example, if a user is having trouble logging in to the intranet site, the user can create an IT service desk ticket by sharing a screenshot of the problem with the unified bot. The unified bot extracts the URL which the user is trying to access and fetch the user details from active directory. Depending on the user persona, the unified bot responds to help resolve the issue. It may inform the user that they are not authorized to access the site or ask if the user would like to raise a ticket to gain access to the portal.

Another example is that users can easily apply for leaves on specific dates using the unified bot. They can check the available leaves and leave policy from a single window instead of navigating through multiple systems for the same task. In another example users can use the unified bot to check for compliance regarding Personal Identifying Information (PII) in an excel document they intend to share with a broader audience.

The disclosed virtual assistant is capable of handling and switching across multiple contexts by leveraging concept of agents and tools to work as a multi-index retriever. All these technologies have been interacted to bring the value chain for all possible stakeholders of the enterprise. The virtual assistant brings value chain applicable to all possible stakeholders including customer, supplier and enterprise persona (associates, stores, sales, merchandising and supply chain, service desk). The VA addresses the challenges of having multiple bots for various processes by providing personalized and contextual responses to the users. It answers not only questions related to customer service, employee policies, IT service desk, and enterprise applications but can also provide valuable insights and perform low-complexity tasks of the users. The VA can retrieve and process information from various sources, such as the company’s knowledge base, customer support database, and other enterprise IT systems. With time, the virtual assistant can learn and improve its responses, making them more precise and effective. Few examples of how the virtual assistant provides value to different stakeholders are given below:

1. Customers: The virtual assistant can assist customers in finding products as per their current needs, tracking orders, scheduling order deliveries, and processing returns. It can also provide personalized recommendations and insights.
2. Employees: The virtual assistant can help apply for leave, reset passwords, and provide insights on business processes in conversational ways. It can also inform employees about benefits, policies, and procedures.
3. Suppliers: The virtual assistant can assist suppliers in tracking orders, managing inventory, and communicating with the enterprise. It can also provide suppliers with insights into customer demand.
4. Sales: The virtual assistant can assist sales staff in tracking sales on various parameters.
5. Merchandising and Supply Chain: The virtual assistant can assist merchandising & supply chain teams of an enterprise to keep track of various details related to inventory, demand and support related queries.
6. Service Desk: The virtual assistant can assist service desk associates to perform various low complexity task in automated manner, address user queries related to process and policies etc.

Figure 2:
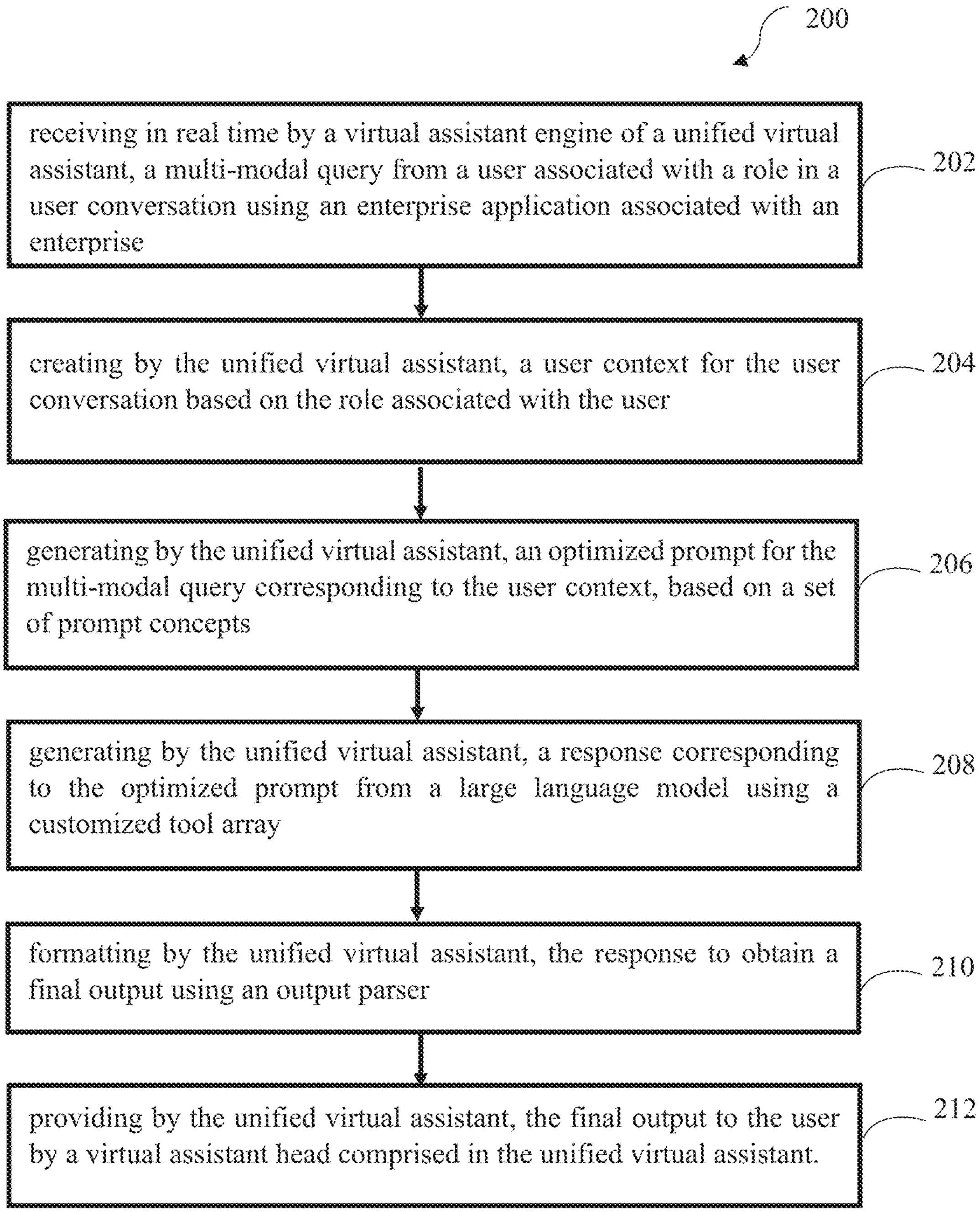
FIG. 2 is an exemplary flow diagram for a method for generative AI based unified virtual assistant in accordance with some embodiments of the present disclosure.

Referring now to the drawings, and more particularly to FIG. 1 through FIG. 2, where similar reference characters denote corresponding features consistently throughout the figures, there are shown preferred embodiments and these embodiments are described in the context of the following exemplary system and/or method.

FIG. 1 illustrates an exemplary block diagram of a system 100 for generative artificial intelligence (AI) based unified virtual assistant according to some embodiments of the present disclosure. In an embodiment, the system 100 includes one or more hardware processors 102, communication interface(s) or input/output (I/O) interface(s) 106, and one or more data storage devices or memory 104 operatively coupled to the one or more processors 102. The one or more hardware processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

In an embodiment, the memory 104 includes a plurality of modules 108 that can include modules such as a virtual assistant engine, a context manager, a prompt manager, and the like. The plurality of modules includes programs or coded instructions that supplement applications or functions performed by the system 100 for executing different steps involved in the process of motion capture and retargeting being performed by the system 100. The plurality of modules, amongst other things, can include routines, programs, objects, components, and data structures, which performs particular tasks or implement particular abstract data types. The plurality of modules may also be used as, signal processor(s), node machine(s), logic circuitries, and/or any other device or component that manipulates signals based on operational instructions. Further, the plurality of modules can be used by hardware, by computer-readable instructions executed by the one or more hardware processors 102, or by a combination thereof. The plurality of modules can include various sub-modules (not shown).

Further, the memory 104 may include a database or repository. The memory 104 may comprise information pertaining to input(s)/output(s) of each step performed by the processor(s) 102 of the system 100 and methods of the present disclosure. In an embodiment, the database may be external (not shown) to the system 100 and coupled via the I/O interface 106.

The disclosed virtual assistant comprises various components or modules including, a virtual assistant engine, a context manager, a prompt manager, a model orchestration, and models. The virtual assistant engine includes a chat interface through which conversation happens. This involves a user interface running either in browser, or mobile app or other enterprise chat heads. The context manager maintains various contextual data including enterprise context data, user context data and related processing and lifecycle management of enterprise or user. The prompt manager component is responsible for prompt string handling and supplementing user input with contextual data. The model orchestration orchestrates actions in sequence or combination more than once which includes calling customer specific Application Programming Interface (API), calling generic API, calling Large Language Models (LLMs) and filter final response as needed. Models are a set of LLM models which helps in providing response to a user query provided via the chat interface. The functioning of these components is explained in conjunction with FIG. 2 as mentioned below.

FIG. 2 is an exemplary flow diagram for a method for generative AI based unified virtual assistant in accordance with some embodiments of the present disclosure.

In an embodiment, the system 100 comprises one or more data storage devices or the memory 104 operatively coupled to the one or more hardware processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, the one or more hardware processors 102 are configured to receive in real time a multi-modal query from a user associated with a role in a user conversation using an enterprise application associated with an enterprise. The multi-modal query is received by a virtual assistant engine of the unified virtual assistant. The multi-modal query can be a text, an image, a voice data, or combinations thereof. The VA has an end user layer comprising tools like various browsers, mobile apps or any other chat heads that are used by users to access the User Interface (UI) components. The end user layer provides graphical user interface (GUI) through which conversation happens. This is either the set of UI components developed in front end technologies or standard chat heads. The end user layer accepts the user queries in form of text and pass on the same to the unified virtual assistant to provide the response. Once response is received, it helps to present the formatted output to end user's device. This is a device agnostic layer and can provide response in a template best suited for client-side device.

At step 204 of the method 200, the one or more hardware processors 102 are configured to create a user context for the user conversation based on the role associated with the user by the unified virtual assistant. The user context is a context which contains information related to a current session of chat being done by the specific user. The multi-modal query is received by an agent of the virtual assistant engine via an API gateway and maintain a context corresponding to the user's session in a user context database. API gateway accepts the user queries in form of text and pass on the same to requested API of the unified virtual assistant. The context manager maintains the contextual data in the user context database and in an enterprise context database for enterprise context. The user context contains information of user's action, history questions, profile and so on whereas the enterprise context provides embeddings or key phrases based on static data of customer enterprise (like policy documents, user manuals, handbooks and any other information on enterprise processes, tools, service desk, website etc.), which should be used for addressing the user's query by generative artificial intelligence (AI) models. Contexts enables to maintain linking of sequential or back-to-back queries to have the correlation being done in multiple queries in correct manner. It also helps to provide the context with respect to customer enterprise that should be used while addressing any query or generating any response using the generative AI models. The model orchestration component is developed using agents, tools, and chains for generating required response for the user query. The model orchestration component helps to understand to which context the user is asking the user query and switch between different contexts as well in the same conversation while maintaining the relatedness of previous conversations. This is implemented using conversational chat agent and providing it with a set of tools in form of a customized tool array. Each tool has a specific name, a description or a prompt and a call-back function.

User context is created by instantiating object of ChatAgent custom class and once created, it is stored in session object provided by UI library, which is used to create the user interface of the unified virtual assistant. There is separate instance of user context object on the virtual assistant engine for all active users at any instance of time. This context for any logged in user contains information about users' demographics and last few questions asked by user. The unified virtual assistant supports switching between one or more user contexts in a current user conversation based on roles associated with the one or more user contexts. The one or more user contexts relate to a user context in a previous user conversation.

Switching between different contexts in the unified virtual assistant is done by roles. By default, there is always a role assigned to the user, which is for example GUEST_CUSTOMER. The various roles considered are as listed below and are expected to be changed or customized as per the enterprise for which the unified virtual assistant is implemented. Roles are supposed to be already assigned in users or active directory used for managing identities in customer organization. This is fetched at time of successful login in the unified virtual assistant. Few examples of different roles considered in the unified virtual assistant are listed below:

GUEST_CUSTOMER
LOGGED_IN_CUSTOMER
HR_GUEST
HR_EMPLOYEE
HR_ADMIN
PROCUREMENT_GUEST
PROCUREMENT_EMPLOYEE
PROCUREMENT_ADMIN
ITSM_GUEST
ITSM_EMPLOYEE
ITSM_ADMIN
STORES_GUEST
STORES_EMPLOYEE
STORES_ADMIN

The role elevation happens upon logging in. Once a role is assigned, the user can ask questions. If the role is privileged to answer, it returns the response else it may ask to sign in or deny access based upon the workflow. In addition, certain features would be restricted within the organization firewall such as employee handbook and human resource (HR) related policies. Users must be within the firewall to access employee data with the organization.

As an example, considering Persona A: End Customer enters the website. A GUEST ROLE is assigned to the user. Within this role the end customer can know about company's generic information such as return, refund policies. In case the user wants to know the status of a particular order number, the unified virtual assistant would prompt the user to LOGIN. Upon successful login an elevated role would be assigned to the user.

Considering Persona B: An associate within the organization firewall enters the website. A GUEST ROLE allows the associate to view policy documents and company handbook. Upon asking his leave balance the unified virtual assistant prompts the associate to LOGIN. Upon successful login an elevated role is assigned to the associate.

At step 206 of the method 200, the one or more hardware processors 102 are configured to generate an optimized prompt for the multi-modal query corresponding to the user context by the unified virtual assistant, based on a set of prompt concepts. The prompt manager is responsible for prompt string handling and supplementing the multi-modal query with context data. This uses the set of prompt concepts to generate and evolve meaningful prompt to get right answer for any kind of query form from any stakeholder. It makes use of adding required prefix and suffix to the user's query and generate the effective response. The set of prompt concepts are developed based on domain knowledge. The optimized prompt is generated by using the concept of passing required prefix or suffix as input to agent along with the query of the user as another parameter. The agent then modifies the prompt with specified prefix or suffix to get the best response. The prefix or suffix passed are changed or modified dynamically based on the role of the user. For example, if the role of the user is "HR Guest" or "HR Employee", then prefix being passed to agent starts with "You are HR chat assistant . . . ". Likewise, it is changed for other roles accordingly.

At step 208 of the method 200, the one or more hardware processors 102 are configured to generate a response corresponding to the optimized prompt from a large language (LLM) model using the customized tool array by the unified virtual assistant. The customized tool array comprises a set of tools with each tool comprising a set of parameters including the tool description or prompts, the tool name and so on. The response is generated by comparing the optimized prompt with the tool description of each tool in the set of tools to obtain an optimal tool. The optimal tool characterizes a best observation based on the tool description. Further the response is generated by invoking the LLM or an application programming interface (API) call provided in the tool description of the optimal tool. The call-back function associated with the optimized prompt comprises any one such as the API call or the LLM. The LLM is trained using an enterprise context corresponding to the enterprise and a set of user contexts stored in a database. The optimal tool from the customized tool array of the virtual assistant engine is determined based on comparison of the optimal prompt to a set of parameters comprised in the customized tool array. Based on the input multi-modal query received, it attempts to find the best tool that can address this user's query. This decision is based on the description or the prompt that best matches the multi-modal query. This is done by performing a comparison of the user query with the description or the prompt of each tool and further finds the best match. Tools are configured in form of customized tool array along with the set of parameters. During run time this customized tool array is provided to the agent handling the conversation chat. The agent accepts the incoming prompt, interpret it, and compare with the configured description of each tool and takes a call that which is the best tool to be used to address the user's query. If incoming prompt from agent is matching with the configured prompt, then the respective call-back function of tool is executed to take the required action. The agent with help of LLM find the best tool by executing the tool, halting till tool's response is received as an observation for the LLM and then decides the next action based on all preceding responses. Here the LLM generates the human like reasoning before accepting the observation as final response. Thus, final selection of the tool is based on best outcome out of all possible outcome that is supported by human like thought to confirm the observation as final message. Thus, agent uses ReAct (Reason+Act) framework to pick the most usable tool from the set of tools. Few examples of customized tool array is provided further in the description, with the set of parameters considered.

The customized tool array is generated by providing the configurations in form of array of predefined string, as per Langchain framework. These strings contain key value pair, as per Langchain framework. Each element of array logically represents one tool and the value of "func=" key specifies which chain to be invoked or executed if that Tool is selected. Chains are standard interfaces provided by LangChain to create or develop complex application which requires chaining multiple LLMs. Chains combine multiple components together to create a single, coherent application. For example, a chain is created that takes user input, formats it with a prompt template, and then passes the formatted response to an LLM. More complex chains can be built by combining multiple chains together, or by combining chains with other components. One example of a complex chaining is summarization of a text (e.g., movie review) and providing a heading based upon the summarization.

Some of the prominent Chains available in LangChain are: LLM Chain, Sequential Chain, Conversational Retrieval Chain, Retrieval QA, API Chain, Conversation Chain. Out of these available chains the unified virtual assistant leverages LLM Chain, Retrieval QA and API Chain. The LLM Chain is a simple chain that takes in a prompt template, formats it with the user input and returns the response from an LLM. The Retrieval QA chain is a crucial component for question answering in Retrieval augmented generation (RAG). The limitation of Retrieval QA chain has the inability that it can't preserve conversational history. Each question is treated independently, and the model does not have access to past questions or answers. The API Chain enables using LLMs to interact with APIs to retrieve relevant information. The unified virtual assistant uses this chain to interact with various API based calls that are available at enterprise level.

A sample customized tool array configured in the unified virtual assistant with their description is provided below:

```
tools = {
store_kb_tool:Tool(name=store_kb_tool,func=retrival_chains[store_it_
svc_chain].run, return_direct=True,
description="Useful for answering questions related any Store questions,
mobile wrapper, issues with mobile devices, troubleshooting mobile
SLED, TC51, TC20, SB1, MC40 and other devices."),
code_of_conduct_tool:Tool(name=code_of_conduct_tool,func=
retrival_chains [code_of_conduct_chain].run, return_direct=False,
description="Useful for answering anything about company's ethics,
morals, compliance and guidelines for Conflicts of Interest, Diversity,
Equity, and Inclusion, Engaging via Social Media, Gifts and
Entertainment, Media Relations, Workplace Conduct, Anti-Bribery,
Anti-Money Laundering, Antitrust and Fair Competition, Company
Assets and Resources, Confidential and Proprietary Information,
Financial Integrity, Food Safety, Sanitation, and Freshness, Fraud,
Waste, and Abuse of Government Funds, Insider Trading Laws,
Intellectual Property, Privacy, Trade Controls, Responsibility towards
Environment, Human Rights, Political Activity, Sustainability"),
hr_policy_doc_tool:Tool(name=hr_policy_doc_tool,func=retrival_chains
[hr_policy_doc_chain].run, return_direct=False,
```

-continued

```
description="Useful for employees to seek answers for any human
resource
or HR Policies like Grade Structure, Hiring and Joining, Recruitment for
Permanent Employees, Recruitment for Associate Trainee Program, Join-
ing
process, Hiring of relatives, Probation and Confirmation, Notice period,
Compensation and Benefits, Leave travel assistance policy, Policy on
usage
of mobile phones, Employee Gift Policy, Provident Fund Benefit Policy,
Gratuity Benefit Policy, Performance Management process, Leave Policy,
Employee Relocation Policy, Working Hours or Days, Dress code,
Attendance, Internal transfers, Separation Process"),
retailer_for_u_tool:Tool(name=retailer_for_u_tool, func=retrival_chains
[retailer_for_u_chain].run, return_direct=False,
description="Use this tool always for answering any queries and FAQ that
customers can have in and around \"Retailer For U\" and \"Fresh Pass\"
loyalty program, earning points/rewards, Savings Cards, deals, weekly
ads, SNAP EBT, accepted payment methods, Vine and Cellar, types of
refunds, refund policies, types of returns, how to return, out of stock
situations, FAQ on order modification and cancellations, shipping and
delivery policies, delivery related queries, delivery to businesses, delivery
charges and shopping FAQ.")
}
```

At step 210 of the method 200, the one or more hardware processors 102 are configured to format the response to obtain a final output using an output parser by the unified virtual assistant. The output parser parses the response from the LLM or API call to the final output.

At step 212 of the method 200, the one or more hardware processors 102 are configured to provide the final output to the user by a virtual assistant head comprised in the unified virtual assistant. Once the final output is received, the virtual assistant head present it to the user's device. The received final output is rendered in user interface of the virtual assistant head.

As an example, with an ITSM role, a user is taking help on IT service desk related information asking for order status of self. The unified virtual assistant provides the following output:

User: What is the status of my order number 5?

UVA: The status of order number 5 is

| | |
|---|---|
| orderStatus | PROCESSING |

User: How many orders are in PENDING/SHIPPED state?

UVA: Here is the information on the number of orders in PENDING/SHIPPED state

PENDING: 1 order

SHIPPED: 3 orders

| Order Status | Number of Orders |
|---|---|
| PENDING | 1 |
| SHIPPED | 3 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiment of present disclosure herein addresses the problem of personalized virtual assistant which serves as a unified conversational agent for all processes in the enterprise. The disclosed virtual assistant performs low-complexity tasks, retrieve and process information from various sources, such as the company's knowledge base, customer support database, and other enterprise IT systems.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:

receiving in real time by a virtual assistant engine of a unified virtual assistant, via one or more hardware processors, a multi-modal query from a user associated with a role in a user conversation using an enterprise application associated with an enterprise;

creating by the unified virtual assistant, via the one or more hardware processors, a user context for the user conversation based on the role associated with the user, wherein the user context is a context which contains information related to a current session of chat being done by a specific user, wherein the user context enables to maintain linking of sequential and back-to-back queries to have a correlation being done in multiple queries in correct manner, wherein the user context is created by instantiating object of chat agent custom class and storing in session provided by UI library, wherein the UI library is used to create a user interface of the unified virtual assistant;

generating by the unified virtual assistant, via the one or more hardware processors, an optimized prompt for the multi-modal query corresponding to the user context, based on a set of prompt concepts, wherein the optimized prompt is generated by passing a required prefix or suffix as an input to an agent along with query of the user as another parameter, wherein the agent then modifies the prompt with specified prefix or suffix to get the best response, wherein the passed prefix or suffix are changed or modified dynamically based on the role of the user;

training a large language model (LLM) using an enterprise context corresponding to the enterprise and a set of user contexts stored in a database;

generating by the unified virtual assistant, via the one or more hardware processors, a response corresponding to the optimized prompt from the LLM using a customized tool array, wherein the customized tool array comprises a set of tools with each tool comprising a set of parameters including a tool description, wherein an optimal tool from the customized tool array of the virtual assistant engine is determined based on comparison of the optimal prompt to a set of parameters comprised in the customized tool array, wherein the agent using the LLM finds the optimal tool by executing the tool, halting till tool's response is received as an observation for the LLM and decides the next action based on all preceding responses;

formatting by the unified virtual assistant, via the one or more hardware processors, the response to obtain a final output using an output parser; and providing by the unified virtual assistant, via the one or more hardware processors, the final output to the user by a virtual assistant head comprised in the unified virtual assistant;

switching between one or more user contexts in a current user conversation based on roles associated with the one or more user contexts, wherein the one or more user contexts relate to a user context in a previous user conversation, wherein the unified virtual assistant handles and switches across multiple contexts by using agents and tools to work as a multi-index retriever, wherein the unified virtual assistant provides personalized and contextual responses to the user, wherein the unified virtual assistant learns and improves the responses.

2. The processor implemented method of claim 1, wherein the multi-modal query is one of (i) a text, (ii) an image or (iii) a voice data, wherein based on the multi-modal query received, the customized tool array determines the optimal tool that addresses the user query, wherein the decision to determine the optimal tool is based on the description and the prompt that best matches the multi-modal query, wherein a comparison is performed of the user query with the description or the prompt of each tool, wherein the tools are configured in the form of customized tool array along with the set of parameters, wherein during run time the customized tool array is provided to the agent handling the conversation chat, wherein the agent accepts the incoming prompt, interpret it, and compare with the configured description of each tool and decides on the optimal tool to be used to address the user query.

3. The processor implemented method of claim 1, wherein the set of prompt concepts are dynamically modified for generating the optimized prompt based on the role of the user.

4. The processor implemented method of claim 1, wherein generating the response comprises, comparing, via the one or more hardware processors, the optimized prompt with the tool description of each tool in the set of tools to obtain an optimal tool, wherein the optimal tool characterizes a best observation based on the tool description; and generating, via the one or more hardware processors, the response by invoking the LLM or an application programming interface (API) call provided in the tool description of the optimal tool.

5. The processor implemented method of claim 1, wherein the user context corresponding to the user's session in a user context database is maintained by receiving multi-modal query by the agent of the virtual assistant engine via an application programming interface (API) gateway, wherein the API gateway accepts the user queries in the form of text and pass on the same to requested API of the unified virtual assistant, wherein the user context contains information of user's action, history questions, profile, wherein the user context helps in providing the context with respect to customer enterprise, wherein the LLM generates human like reasoning before accepting the observation as a final response, wherein the agent uses reason and act framework to pick the most usable tool from the set of tools.

6. The processor implemented method of claim 1, wherein the customized tool array is generated by providing configurations in the form of array of predefined string, as per Langchain framework, wherein the strings contain key value pair, as per the Langchain framework, wherein each element of the customized tool array array logically represents one tool and the value of key specifies which chain to be invoked or executed if that tool is selected.

7. A system, comprising:

a memory storing instructions;

one or more communication interfaces; and one or more hardware processors coupled to the memory via the one or more communication interfaces, wherein the one or more hardware processors are configured by the instructions to:

receive in real time by a virtual assistant engine of a unified virtual assistant, a multi-modal query from a user associated with a role in a user conversation using an enterprise application associated with an enterprise;

create by the unified virtual assistant, a user context for the user conversation based on the role associated with the user, wherein the user context is a context which contains information related to a current session of chat being done by a specific user, wherein the user context enables to maintain linking of sequential and back-to-back queries to have a correlation being done in multiple queries in correct manner, wherein the user context is created by instantiating object of chat agent custom class and storing in session provided by UI library, wherein the UI library is used to create a user interface of the unified virtual assistant;

generate by the unified virtual assistant, an optimized prompt for the multi-modal query corresponding to the user context, based on a set of prompt concepts, wherein the optimized prompt is generated by passing a required prefix or suffix as an input to an agent along with query of the user as another parameter, wherein the agent then modifies the prompt with specified prefix or suffix to get the best response, wherein the passed prefix or suffix are changed or modified dynamically based on the role of the user;

training a large language model (LLM) using an enterprise context corresponding to the enterprise and a set of user contexts stored in a database;

generate by the unified virtual assistant, a response corresponding to the optimized prompt from a large language model (LLM) using a customized tool array, wherein the customized tool array comprises a set of tools with each tool comprising a set of parameters including a tool description, wherein an optimal tool from the customized tool array of the virtual assistant engine is determined based on comparison of the optimal prompt to a set of parameters comprised in the customized tool array, wherein the agent using the LLM finds the optimal tool by executing the tool, halting till tool's response is received as an observation for the LLM and decides the next action based on all preceding responses;

format by the unified virtual assistant, the response to obtain a final output using an output parser; and provide by the unified virtual assistant, the final output to the user by a virtual assistant head comprised in the unified virtual assistant;

switch between one or more user contexts in a current user conversation based on roles associated with the one or more user contexts, wherein the one or more user contexts relate to a user context in a previous user conversation, wherein the unified virtual assistant handles and switches across multiple contexts by using agents and tools to work as a multi-index retriever, wherein the unified virtual assistant provides personalized and contextual responses to the user, wherein the unified virtual assistant learns and improves the responses.

8. The system of claim 7, wherein the multi-modal query is one of (i) a text, (ii) an image or (iii) a voice data, wherein based on the multi-modal query received, the customized tool array determines the optimal tool that addresses the user query, wherein the decision to determine the optimal tool is based on the description and the prompt that best matches the multi-modal query, wherein a comparison is performed of the user query with the description or the prompt of each tool, wherein the tools are configured in the form of customized tool array along with the set of parameters, wherein during run time the customized tool array is provided to the agent handling the conversation chat, wherein the agent accepts the incoming prompt, interpret it, and compare with the configured description of each tool and decides on the optimal tool to be used to address the user query.

9. The system of claim 7, wherein the set of prompt concepts are dynamically modified for generating the optimized prompt based on the role of the user.

10. The system of claim 7, wherein the one or more hardware processors are configured to generate the response by, comparing the optimized prompt with the tool description of each tool in the set of tools to obtain an optimal tool, wherein the optimal tool characterizes a best observation based on the tool description; and generating the response by invoking the LLM or an application programming interface (API) call provided in the tool description of the optimal tool.

11. The system of claim 7, wherein the user context corresponding to the user's session in a user context database is maintained by receiving multi-modal query by the agent of the virtual assistant engine via an application programming interface (API) gateway, wherein the API gateway accepts the user queries in the form of text and pass on the same to requested API of the unified virtual assistant, wherein the user context contains information of user's action, history questions, profile, wherein the user context helps in providing the context with respect to customer enterprise, wherein the LLM generates human like reasoning before accepting the observation as a final response, wherein the agent uses reason and act framework to pick the most usable tool from the set of tools.

12. One or more non-transitory machine-readable information storage mediums comprising one or more instructions which when executed by one or more hardware processors cause:

receiving in real time by a virtual assistant engine of a unified virtual assistant, a multi-modal query from a user associated with a role in a user conversation using an enterprise application associated with an enterprise;

creating by the unified virtual assistant, a user context for the user conversation based on the role associated with the user, wherein the user context is a context which contains information related to a current session of chat being done by a specific user, wherein the user context enables to maintain linking of sequential and back-to-back queries to have a correlation being done in multiple queries in correct manner, wherein the user context is created by instantiating object of chat agent custom class and storing in session provided by UI library, wherein the UI library is used to create a user interface of the unified virtual assistant;

generating by the unified virtual assistant, an optimized prompt for the multi-modal query corresponding to the user context, based on a set of prompt concepts, wherein the optimized prompt is generated by passing a required prefix or suffix as an input to an agent along with query of the user as another parameter, wherein the agent then modifies the prompt with specified prefix or suffix to get the best response, wherein the passed prefix or suffix are changed or modified dynamically based on the role of the user;

training a large language model (LLM) using an enterprise context corresponding to the enterprise and a set of user contexts stored in a database;

generating by the unified virtual assistant, a response corresponding to the optimized prompt from a large language model (LLM) using a customized tool array, wherein the customized tool array comprises a set of tools with each tool further comprising a set of parameters including a tool description, wherein an optimal tool from the customized tool array of the virtual assistant engine is determined based on comparison of the optimal prompt to a set of parameters comprised in the customized tool array, wherein the agent using the LLM finds the optimal tool by executing the tool, halting till tool's response is received as an observation for the LLM and decides the next action based on all preceding responses;

formatting by the unified virtual assistant, the response to obtain a final output using an output parser; and providing by the unified virtual assistant, the final output to the user by a virtual assistant head comprised in the unified virtual assistant;

switching between one or more user contexts in a current user conversation based on roles associated with the one or more user contexts, wherein the one or more user contexts relate to a user context in a previous user conversation, wherein the unified virtual assistant handles and switches across multiple contexts by using agents and tools to work as a multi-index retriever, wherein the unified virtual assistant provides personalized and contextual responses to the user, wherein the unified virtual assistant learns and improves the responses.

13. The one or more non-transitory machine-readable information storage mediums of claim 12, wherein the multi-modal query is one of (i) a text, (ii) an image or (iii) a voice data, wherein based on the multi-modal query received, the customized tool array determines the optimal tool that addresses the user query, wherein the decision to determine the optimal tool is based on the description and the prompt that best matches the multi-modal query, wherein a comparison is performed of the user query with the description or the prompt of each tool, wherein the tools are configured in the form of customized tool array along with the set of parameters, wherein during run time the customized tool array is provided to the agent handling the conversation chat, wherein the agent accepts the incoming prompt, interpret it, and compare with the configured description of each tool and decides on the optimal tool to be used to address the user query.

14. The one or more non-transitory machine-readable information storage mediums of claim 12, wherein the set of prompt concepts are dynamically modified for generating the optimized prompt based on the role of the user.

15. The one or more non-transitory machine-readable information storage mediums of claim 12, wherein generating the response comprises, comparing, the optimized prompt with the tool description of each tool in the set of tools to obtain an optimal tool, wherein the optimal tool characterizes a best observation based on the tool description; and generating, the response by invoking the LLM or an application programming interface (API) call provided in the tool description of the optimal tool.

16. The one or more non-transitory machine-readable information storage mediums of claim 12, wherein the user context corresponding to the user's session in a user context database is maintained by receiving multi-modal query by the agent of the virtual assistant engine via an application programming interface (API) gateway, wherein the API gateway accepts the user queries in the form of text and pass on the same to requested API of the unified virtual assistant, wherein the user context contains information of user's action, history questions, profile, wherein the user context helps in providing the context with respect to customer enterprise, wherein the LLM generates human like reasoning before accepting the observation as a final response, wherein the agent uses reason and act framework to pick the most usable tool from the set of tools.

* * * * *